(12) United States Patent  (10) Patent No.: US 7,212,689 B2
Muresan et al.  (45) Date of Patent: May 1, 2007

(54) FAST EDGE DIRECTED POLYNOMIAL INTERPOLATION

(75) Inventors: David Darian Muresan, Seattle, WA (US); David Muresan, Seattle, WA (US)

(73) Assignee: D. Darian Muresan, Arlington, VA (US)

( * ) Notice: Subject to any disclaimer, the term of this patent is extended or adjusted under 35 U.S.C. 154(b) by 703 days.

(21) Appl. No.: 10/288,434

(22) Filed: Nov. 6, 2002

(65) Prior Publication Data

US 2004/0086201 A1    May 6, 2004

(51) Int. Cl.
*G06K 9/32* (2006.01)
*H04N 1/46* (2006.01)

(52) U.S. Cl. .................... 382/300; 358/525

(58) Field of Classification Search ........ 382/298–300, 382/262, 275; 348/439, 561, 452, 582, 234, 348/273; 375/240.02; 358/525, 528; 345/606
See application file for complete search history.

(56) References Cited

U.S. PATENT DOCUMENTS

| 5,504,531 | A | * | 4/1996 | Knee et al. | 348/452 |
|---|---|---|---|---|---|
| 5,649,034 | A | * | 7/1997 | Sonobe | 382/298 |
| 5,708,474 | A | * | 1/1998 | Hong | 348/448 |
| 5,708,693 | A | * | 1/1998 | Aach et al. | 378/62 |
| 6,295,087 | B1 | * | 9/2001 | Nohda | 348/234 |
| 6,650,790 | B1 | * | 11/2003 | Arbeiter et al. | 382/275 |
| 6,704,358 | B1 | * | 3/2004 | Li et al. | 375/240.02 |
| 6,707,937 | B1 | * | 3/2004 | Sobel et al. | 382/162 |
| 6,836,289 | B2 | * | 12/2004 | Koshiba et al. | 348/273 |
| 6,980,254 | B1 | * | 12/2005 | Nishihashi et al. | 348/452 |

* cited by examiner

*Primary Examiner*—Kanjibhai Patel

(57) ABSTRACT

Image interpolation is becoming an increasingly important topic in digital image processing, especially as consumer digital photography is becoming ever more popular. From enlarging consumer images to creating large artistic prints, interpolation is at the heart of it all. This invention present a new method for image interpolation, which produces high quality results, yet it's speed is comparable to polynomial interpolation (i.e. cubic interpolation).

1 Claim, 6 Drawing Sheets

(a)

(b)

(a)

(b)

(a)

(b)

(a)

(b) (c)

FAST EDGE DIRECTED POLYNOMIAL INTERPOLATION

BACKGROUND OF THE INVENTION

It has been known for some time that classical interpolation techniques, such as linear and bi-cubic interpolation, are not good performers since these methods tend to blur and create jaggedness in edges. Wavelets have been used in interpolation with mixed results. These methods assume the image has been passed through a low pass filter before decimation and then try to estimate the missing details, or wavelet coefficients, from the low resolution scaling coefficients. One drawback to these approaches is that they assume the knowledge of the low pass filter. A second and more severe drawback is that the image model these methods assume depends heavily on the assumption that the fine detail coefficients are known, which in the interpolation case are not. Directional interpolation processes try to first detect edges and then interpolate along edges, avoiding interpolation across edges. In this class, there are processes that do not require the explicit detection of edges. Rather the edge information is built into the process itself. The drawbacks with most processes we have tested, including the ones mentioned above, is that the processes' focus seems to be on producing sharp images rather than trying to eliminate jagged edges. When processes do focus on maintaining edge integrity images often times look too much like drawings, especially for large enlargement factors.

Two patents that remotely resemble our work are patent numbers WO9956247 and U.S. Pat. No. 6,075,926, although their approach to image interpolation is quite different than ours. Our invention has the advantage of interpolating by the scale factor in one step. In other words, interpolation by 8 is done in one step, as opposed to applying an interpolation by 2 process three times.

BRIEF SUMMARY OF THE INVENTION

For interpolating an image by a factor of K the invention presented here can be summarized as follows:

1. Label the local edge direction at each original pixel by seeing how well a linear interpolation model fits the local pixel. Each pixel has one diagonal and one nondiagonal direction. This is equivalent to saying that from the original image we produce two new images (of the same size) which contain information about the diagonal direction (4) and about the nondiagonal direction (5). The diagonal directions can be: 45 degrees (also named diagonal-1), 135 degrees (also named diagonal-2), or diagonal-neutral. The nondiagonal directions can be zero degrees (also named horizontal), 90 degrees (also named vertical), or nondiagonal-neutral.
2. Upsample the image by K (7).
3. In each diagonal local region estimate the region's diagonal direction using the diagonal labels of the nearby original pixels and interpolate to obtain a diagonal grid (9).
4. In each nondiagonal local region estimate the region's nondiagonal direction using the nondiagonal labels of the nearby original pixels and interpolate.
5. For boundary regions, mirror the image and apply the same interpolation process. This has the affect of filling in the diagonal grid (9).

BRIEF DESCRIPTION OF THE DRAWINGS

FIG. 1-*b* is a representation of a 3×3 local neighborhood in the original image. This figure is used in explaining the labeling step (step 1) of our process.

FIG. 4-*b* is a cut-out from FIG. 4-*a*.

FIG. 5-*b* depicts the diagonal interpolation after going back a second time and interpolating in the direction opposite to the direction of the local image of interest. This is now a diagonal grid (9) in which the interpolated diagonal lines cross themselves in original pixels.

FIG. 6-*b* and FIG. 6-*c* are cutouts from FIG. 6-*a*.

DETAILED DESCRIPTION OF THE INVENTION

Figure 1:
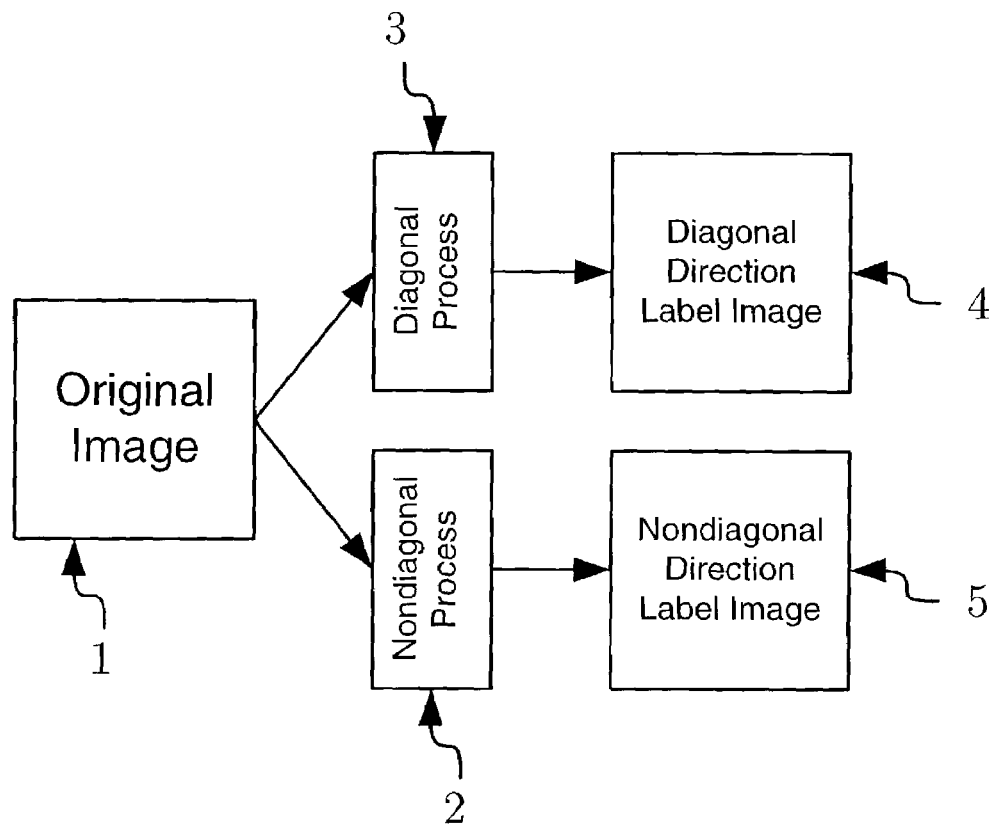
FIG. 1-*a* is a representation for the process of labeling each original image pixel with a diagonal and a nondiagonal direction, thus producing two new images called diagonal direction label image (4) and nondiagonal direction label image (5).

This invention presents a method for enlarging an image by factor K in the horizontal and vertical directions. Before we explain the general procedure, for enlargement by any factor K, we focus our attention to the case when the enlargement factor K is an even integer. In order to better understand the procedure we will further use a working example where the interpolation factor is a factor of K=6. Later, we will show how to generalize the procedure to any real K. In the drawings of FIG. 3, FIG. 4, FIG. 5 and FIG. 6 we use the following convention to label the different classes of pixels. For the interpolated pixels (10) we use a black square, for the pixels that are being processed (11) we use a gray square, for the unprocessed pixels (12) we use a white square, and for the original pixels (13) we use a black square with white diagonal crosses. Further, it is our initial assumption that we are working with a gray scale image. At the end, we will extend the interpolation procedure to color images as well. Here are the interpolation steps:

1. In the original image, each pixel has one diagonal and one nondiagonal direction. The diagonal directions can be: 45 degrees (also named diagonal-1), 135 degrees (also named diagonal-2), or diagonal-neutral. The nondiagonal directions can be zero degrees (also named horizontal), 90 degrees (also named vertical), or non-diagonal-neutral. In FIG. 1-*b*, pixels $p_1, p_2, p_3, p_4, p_5, p_6, p_7, p_8,$ and $p_9$ are the original image pixels. Given a positive threshold value TH, which can be determined adaptively or preselected, the diagonal and nondiagonal directions of pixel $p_5$ are determined as follows:

(a) Calculate the following four differences $$d_1 = \text{abs}\left(\frac{1}{2}(p_4 - p_6) - p_5\right),$$

$$d_2 = \text{abs}\left(\frac{1}{2}(p_3 - p_7) - p_5\right),$$

$$d_3 = \text{abs}\left(\frac{1}{2}(p_2 - p_8) - p_5\right),$$

$$d_4 = \text{abs}\left(\frac{1}{2}(p_1 - p_9) - p_5\right).$$

(b) If $\text{abs}(d_1-d_3)<\text{TH}$ the direction is nondiagonal-neutral,
Else if $d_1<d_3$ the direction is horizontal,
Else the direction is vertical.

(c) If $\text{abs}(d_2-d_4)<\text{TH}$ the direction is diagonal-neutral,
Else if $d_2<d_4$ the direction is diagonal-1,
Else the direction is diagonal-2.

This means that from the original image we can form two new images: the first image, which we call diagonal direction label image (4), corresponds to the diagonal direction (in which each pixels will have one of the three possible labels, namely diagonal-1, diagonal-2, or diagonal-neutral) and the second, which we call nondiagonal direction label image (5), corresponds to the nondiagonal direction (in which each pixels will have one of the three possible labels, namely horizontal, vertical, or nondiagonal-neutral). If we focus our attention on image (4), it is unlikely that in any region of the image we will find an isolated pixel labeled diagonal-1 and being surrounded by diagonal-2 pixels. The reason for this is that in most images, edge pixels are clustered together. If we do find a diagonal-1 pixel surrounded by diagonal-2 pixels, then most likely the labeling of the diagonal-1 pixel was a mistake and the actual label should have been a diagonal-2 label. To further improve the robustness of the labeling process, images (4) and (5) are median filtered and these now form the new labels for the diagonal and nondiagonal directions.

Figure 4:
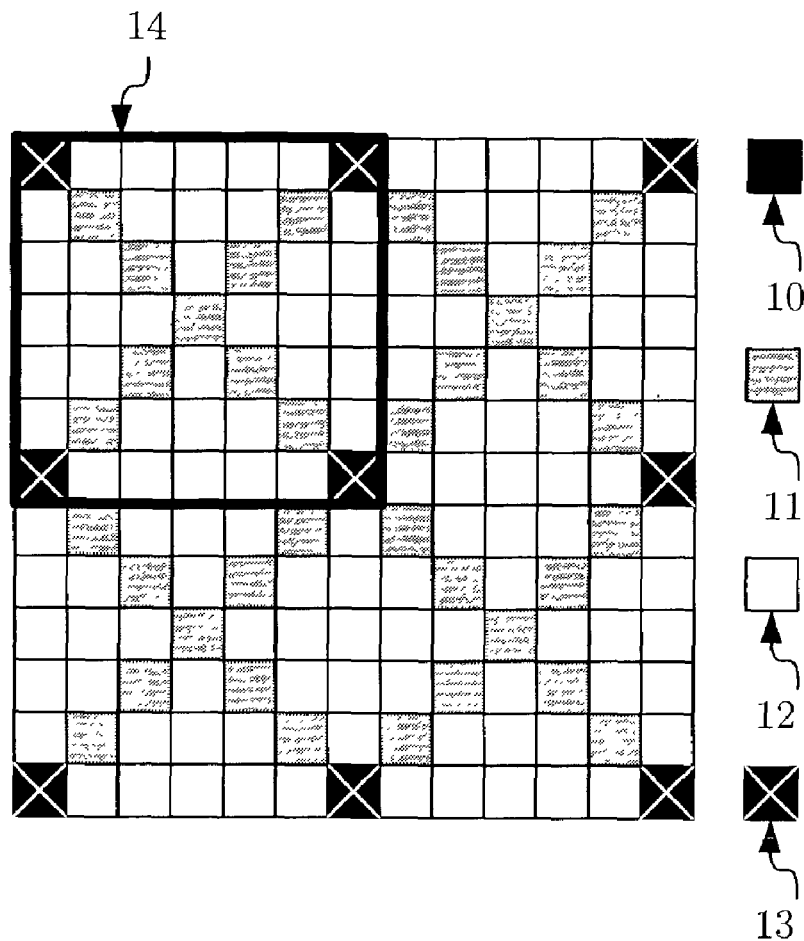
FIG. 4-*a* depicts the first half of the third step of our interpolation process. Namely, it points out the pixels of interest and what pixels we are about to interpolate (10).
Figure 4:
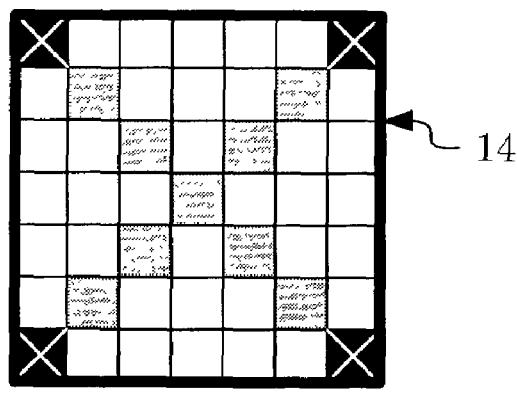

Next, here is the step-by-step procedure for interpolating an image by an even factor, namely K=6:

2. Upsample the image as in FIG. 3 to obtain image (7). In this case, the upsampling factor is K=6.
3. Our next step is to process the diagonal pixels, which are the gray pixels (11) in FIG. 4-*a*. In order to do this, we segment the image into regions of interest that are (K+1)×(K+1) (in our case the regions are 7×7) and focus our attention on one region of interest at a time. In FIG. 4-*a* one such region of interest is (14), which is depicted more clearly in FIG. 4-*b*. Furthermore, FIG. 4-*a* has four such 7×7 regions of interest. We label this region of interest (14) as being diagonal-1, diagonal-2 or diagonal-neutral based on the majority of the diagonal labeling of the nearby original pixels (13). For example, if three of the four nearby pixels are labeled as diagonal-1, then the region will be labeled diagonal-1. The nearby region is a predefined, a priory fixed size. The smallest nearby region would include at least the original pixels (13) in the region of interest (14). If the nearby region would be increased by 6 pixels, this would include all the original pixels (13) shown in FIG. 4-*a* plus all the other original pixels on the left and at the top of (14)—not shown in the figure. Once the region of interest (14) is labeled, we use 1-dimensional interpolation as follows:

(a) If the region of interest is diagonal-1, do 1-dimensional interpolation in the diagonal-1 direction.
Else if the region of interest is diagonal-2, do 1-dimensional interpolation in the diagonal-2 direction.
Else use the interpolated pixel values obtained from bi-cubic interpolation. In our example, FIG. 5-*a* depicts the completion of this step (8). Here, from left-to-right, top-to-bottom, the first region of interest was labeled diagonal-2, the second was labeled diagonal-1, the third and fourth were labeled diagonal-2.

Figure 5:
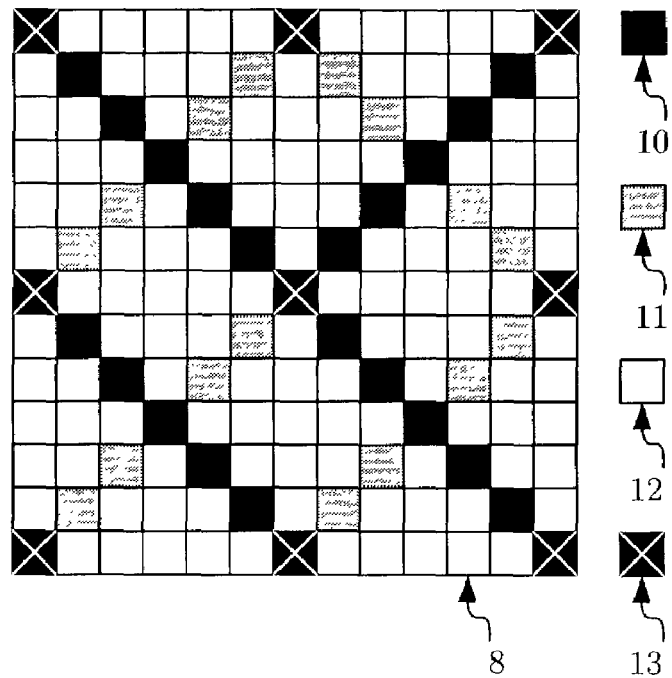
FIG. 5-*a* depicts the diagonal interpolation after the direction of the local image of interest has been determined.
Figure 5:
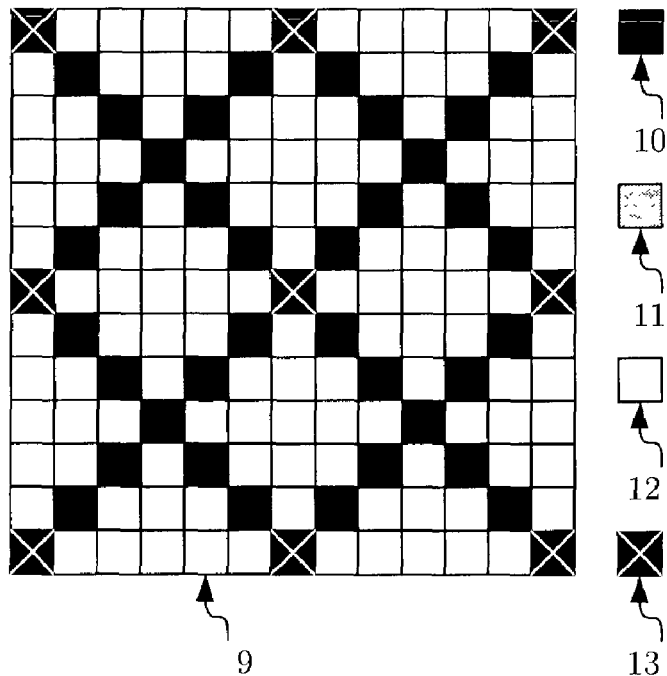

(b) Next, go back to each region of interest and use 1-dimensional interpolation to interpolate in the other directions using the known interpolated values. For the other directions the sampling rate is K/2 (this is why we need K to be an even integer.) In FIG. 5-*a*, the other directions are from left-to-right, top-to-bottom: diagonal-1, diagonal-2, diagonal-1 and diagonal-2. After this step is complete we have a diagonal grid (9) in which the interpolated diagonal lines cross themselves in original pixels as in FIG. 5-*b*.

Notice that the 1-dimensional interpolation does not have to be polynomial interpolation, although this is the most common and we used cubic interpolation.

Figure 6:
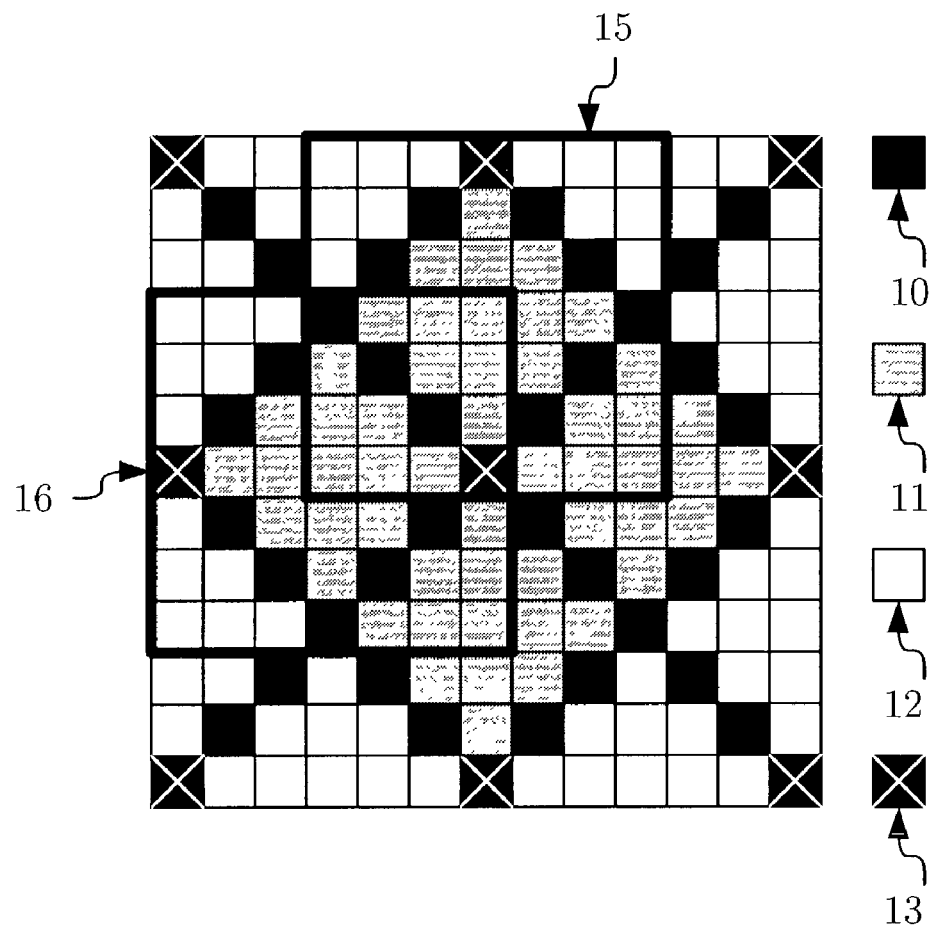
FIG. 6-*a* depicts the fourth step of our interpolation process. The gray pixels (10) represent the pixels that are about to be interpolated.
Figure 6:
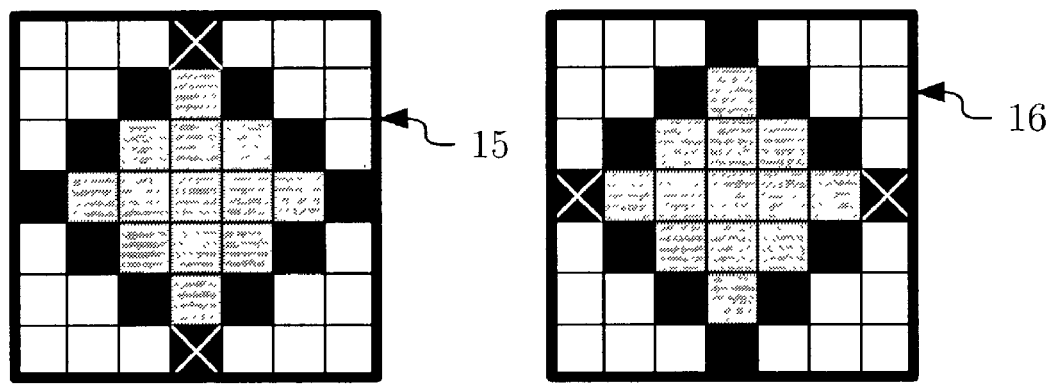

4. Next, we process of horizontal pixels, which are the gray pixels in FIG. 6-*a*. To do this, segment the image into (K+1)×(K+1) regions of interest. In FIG. 6-*a* there are four such regions of interest. This time, two of the regions of interest are (15) (i.e. known pixels on top and bottom) and two are (16) (i.e. known pixels to the left and to the right). However, this does not affect the processing of each region of interest.

Similarly to the previous step, label the regions of interest as horizontal, vertical or nondiagonal-neutral based on the majority of the nondiagonal labeling of the nearby original pixels (13). Once the region of interest (15) and (16) is labeled, use 1-dimensional interpolation as follows:

(a) If the region of interest is horizontal, do 1-dimensional interpolation in the horizontal direction for each row.
Else if the region of interest is vertical, do 1-dimensional interpolation in the vertical direction for each column.
Else use the interpolated pixel values obtained from bi-cubic interpolation.

Notice again that the 1-dimensional interpolation does not have to be polynomial interpolation, although this is the most common and for this step we use linear interpolation. If non-linear interpolation is to be used then the sampling grid is no longer uniformly sampled and more care needs to be taken in finding the cubic coefficients. For completeness we provide one such way here.

Figure 2:
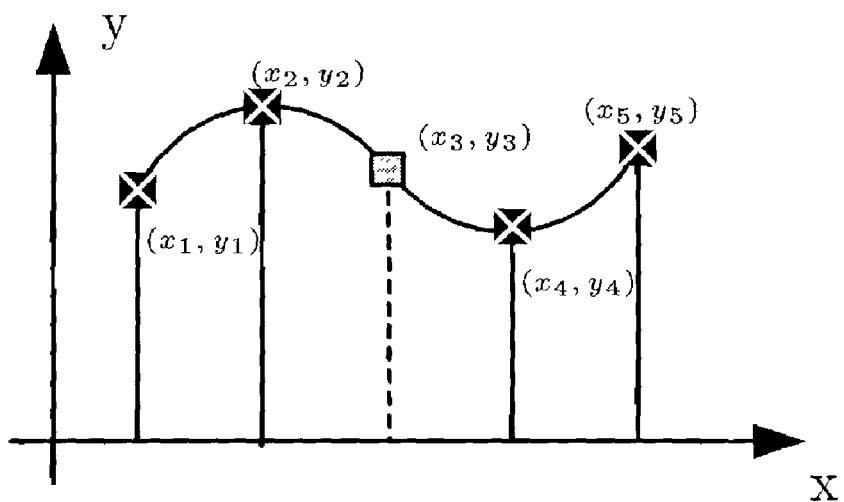
FIG. 2 is a representation of the 1-dimensional cubic interpolation when the sampling grid is non-uniform.
Figure 3:
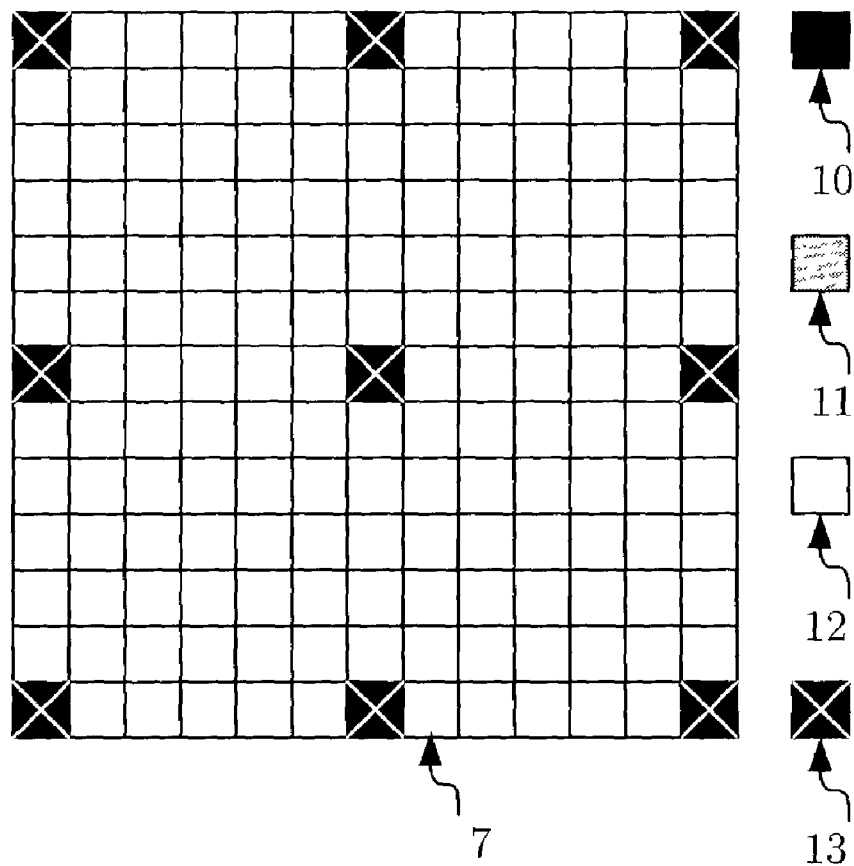
FIG. 3 is the original image upsampled by K=6. It depicts the second step of our interpolation process.

In FIG. 2, the pixel values at $x_1$, $x_2$, $x_4$, and $x_5$ are known, and we want to find the pixel value at $x_3$ (notice that the sampling grid is non-uniform). Further, we want to fit a cubic polynomial through the known samples. This means that:

$$y_3 = ax_3^3 + bx_3^2 + cx_3 + d,$$

with a, b, c, d unknown. The four unknowns can be found by setting up a 4×4 linear system using $y_i = ax_i^3 + bx_i^2 + cx_i + d$ for i=1, 2, 4, 5. This system is invertible as long as $x_1$, $x_2$, $x_4$, and $x_5$ are distinct and $y_3$ is determined uniquely.

5. Our final concern are the white pixels in FIG. 6-a. For an image, the border pixels will remain unprocessed. One way to handle this is very common in the image processing literature and that is to mirror the image across the border in order to process the border pixels. Mirror extension is more desired since it tends to introduce the least amount of high frequencies and intuitively, this reduces ripples around the border pixels (i.e. minimizes the Gibbs phenomenon).

Now that we have a clear understanding of the interpolation process for K-even, let's extend the interpolation procedure to any K:

1. For interpolation when K is and odd integer proceed in two steps. First interpolate for 2K (notice that 2K is even) and then downsample by two. For example, to interpolate by 3, first interpolate by 6 and then downsample by 2.
2. For K a non-integer factor, write K as a fraction of two integers (say K=M/N). Then interpolate by M and downsample by N. In this patent, down-sampling by N means taking every other $N^{th}$ pixel, starting with the first one. Downsampling by 6 the image in FIG. 3 one obtains the original image.

The upsampling and the downsampling can be calculated implicitly without actually storing the upsampled image as a temporary result in memory.

Until now most of the discussion was concerning gray scale images. Some caution must be given when converting the process to a color image. In particular, the caution must be taken in the labeling step (step 1) of the process. We suggest two possible approaches. In practice, both methods yield similar results, with a slight preference towards the second approach:

1. The first approach is to use only the green channel in the labeling step to obtain images (4) and (5). Then use these labels to do the directional 1-dimensional interpolation for each color channel separately (steps 2–5).
2. A better option is to first convert from RGB to CIELab and then use the distance defined in the CIELab space to define $d_1$ through $d_4$, namely:

$$d_1^2 = \left[\frac{1}{2}(L_4 - L_6) - L_5\right]^2 + \left[\frac{1}{2}(a_4 - a_6) - a_5\right]^2 + \left[\frac{1}{2}(b_4 - b_6) - b_5\right]^2$$

$$d_2^2 = \left[\frac{1}{2}(L_3 - L_7) - L_5\right]^2 + \left[\frac{1}{2}(a_3 - a_7) - a_5\right]^2 + \left[\frac{1}{2}(b_3 - b_7) - b_5\right]^2$$

$$d_3^2 = \left[\frac{1}{2}(L_2 - L_8) - L_5\right]^2 + \left[\frac{1}{2}(a_2 - a_8) - a_5\right]^2 + \left[\frac{1}{2}(b_2 - b_8) - b_5\right]^2$$

$$d_4^2 = \left[\frac{1}{2}(L_1 - L_9) - L_5\right]^2 + \left[\frac{1}{2}(a_1 - a_9) - a_5\right]^2 + \left[\frac{1}{2}(b_1 - b_9) - b_5\right]^2$$

and use these distances to obtain the label images (4) and (5). Then use these labels to do the directional 1-dimensional interpolation for each color channel separately (steps 2–5). Of course, other distance metrics can also be tried for the definitions of $d_1$, $d_2$, $d_3$, $d_4$ One comment is in order for the computational cost. If one uses polynomial interpolation for the 1-dimensional interpolation steps, after the classification of the pixel directions (step one) is complete, the number of multiplications and additions is the same as doing standard bi-polynomial interpolation. This means that the process is very fast and ready for today's real-time graphical applications.

Figure 7:
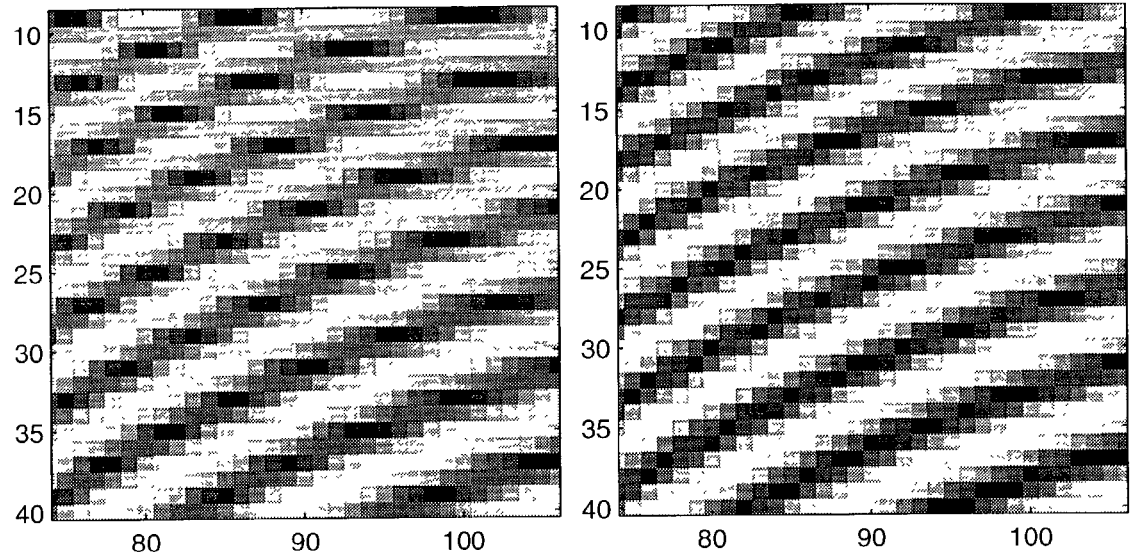
FIG. 7-*a* is an interpolation example using bi-cubic interpolation and FIG. 7-*b* is the same interpolation example using the interpolation procedure presented in this patent.
Figure 8:
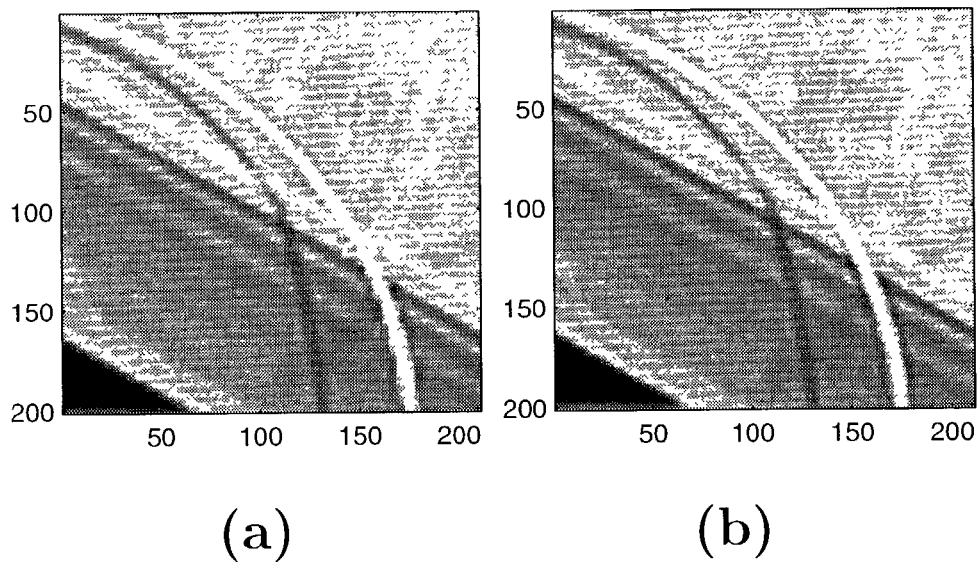
FIG. 8-*a* is a second interpolation example using bi-cubic interpolation and FIG. 8-*b* is the same interpolation example using the interpolation procedure presented in this patent.

We conclude this patent with two examples of the image interpolation process applied to two difference images. The first image is a 512×512 rings image down-sampled by two, without pre-filtering, and then interpolated back to its original size. The downsampling process introduces some aliasing that manifests itself as extra rings going from the top of the image to the lower-right hand corner. Cubic interpolation (FIG. 7-a) maintains the aliasing introduced by the downsampling process, while our interpolation (FIG. 7-b) removes it very nicely (the alias is also more noticeable when the image is kept at arm's length). Notice that the image in FIG. 7-b is much sharper. The second example is a leaf image interpolated by a factor of 4. In FIG. 8-a we have the cubic interpolation and in FIG. 8-b we have the results of the interpolation presented in this patent. Notice how much sharper and less jagged our interpolation is.

We claim:

1. A process for producing from an input color or gray scale original image an interpolated color or gray scale image that is larger in size X times than the original image and comprising of the following steps:
   writing X as a fraction of two integers M/N;
   in the original image selecting a neighborhood (6) with the pixel of interest in the center;
   linearly interpolating in each said neighborhood the center value of the pixel in the horizontal, vertical, diagonal-1 (or 45 degrees) and diagonal-2 (or −45 degrees) directions assuming the center pixel is missing;
   calculating in each said neighborhood the following four absolute errors: the errors between the center pixel and the interpolated values in the horizontal, vertical and two diagonal directions;
   labeling the said center pixel nondiagonal-neutral if the distance of the absolute errors in the horizontal and vertical directions is less than a pre-determined threshold;
   labeling the said center pixel horizontal if it is not labeled nondiagonal-neutral and if the absolute error in the horizontal direction is less than the absolute error in the vertical direction;
   labeling the said center pixel vertical if it is not labeled nondiagonal-neutral and not labeled horizontal;
   labeling the said center pixel diagonal-neutral if the distance of the absolute errors in the diagonal-1 and diagonal-2 directions is less than a pre-determined threshold;
   labeling the said center pixel diagonal-1 if it is not labeled diagonal-neutral and if the absolute error in the diagonal-1 direction is less than the absolute error in the diagonal-2 direction;
   labeling the said center pixel diagonal-2 if it is not labeled diagonal-neutral and not labeled diagonal-1;
   applying the above labeling procedure to each pixel in the original image such that each pixel will have a nondiagonal label and a diagonal label;
   calling the collection of all nondiagonal labels the nondiagonal label image and the collection of all diagonal labels the diagonal label image;
   filtering using a median filter, or other impulsive noise removal filter, the said nondiagonal label image and the said diagonal label image to produce the final nondiagonal label image (5) and the final diagonal label image (4);
   upsampling (inserting zeros between known pixels) the original image by factor M;

naming, in the upsampled image, each M+1 by M+1 block that contains original pixels at the four corners: a local block;
labeling each said local block as diagonal-1, diagonal-2 or diagonal-neutral based on the majority of the diagonal labels of the original nearby pixels;
interpolating the center of the said local block in the diagonal-1 direction (using only original pixels in the diagonal-1 direction) if the block is labeled diagonal-1;
interpolating the center of the said local block in the diagonal-2 direction (using only original pixels in the diagonal-2 direction) if the block is labeled diagonal-2;
interpolating the center of the said local block as the average of all four corners if the local block is labeled diagonal-neutral;
interpolating the said local block in the two diagonal directions using the original pixels and the center pixel interpolated above;
interpolating all the local blocks as described above and call this: the upsampled and diagonally interpolated image;
naming, in the said upsampled and diagonally interpolated image, each M+1 by M+1 block that contains original pixels and centers, of the local blocks, at the midway points of the four sides: a local rhombus;
labeling each said local rhombus as horizontal, vertical or nondiagonal-neutral based on the majority of the non-diagonal labels of the original nearby pixels;
interpolating the said local rhombus in the horizontal direction and using the pixels of the said upsampled and diagonally interpolated image if the local rhombus is labeled horizontal;
interpolating the said local rhombus in the vertical direction and using the pixels of the said upsampled and diagonally interpolated image if the local rhombus is labeled vertical;
averaging the horizontal and vertical interpolation of the said local rhombus if the said local rhombus is labeled nondiagonal-neutral;
downsampling by N (taking every Nth pixel).

* * * * *